US012730276B2

(12) United States Patent
Towery

(10) Patent No.: US 12,730,276 B2
(45) Date of Patent: Sep. 8, 2026

(54) OPTICAL FIBER CABLE WITH WELDED ARMOR LAYER

(71) Applicant: CORNING RESEARCH & DEVELOPMENT CORPORATION, Corning, NY (US)

(72) Inventor: Taylor Buckley Towery, Morganton, NC (US)

(73) Assignee: CORNING RESEARCH & DEVELOPMENT CORPORATION, Corning, NY (US)

(*) Notice: Subject to any disclaimer, the term of this patent is extended or adjusted under 35 U.S.C. 154(b) by 265 days.

(21) Appl. No.: 18/233,009

(22) Filed: Aug. 11, 2023

(65) Prior Publication Data

US 2023/0384545 A1 Nov. 30, 2023

Related U.S. Application Data

(63) Continuation of application No. PCT/US2022/016370, filed on Feb. 15, 2022.

(60) Provisional application No. 63/151,196, filed on Feb. 19, 2021.

(51) Int. Cl.
*G02B 6/44* (2006.01)

(52) U.S. Cl.
CPC ........... *G02B 6/443* (2013.01); *G02B 6/4435* (2013.01); *G02B 6/4488* (2013.01)

(58) Field of Classification Search
CPC ..... G02B 6/443; G02B 6/4435; G02B 6/4488
See application file for complete search history.

(56) References Cited

U.S. PATENT DOCUMENTS

| | | | | |
|---|---|---|---|---|
| 6,496,625 | B1 | 12/2002 | Falkowich et al. | |
| 10,254,494 | B2 * | 4/2019 | Gimblet | G02B 6/4434 |
| 2003/0192707 | A1 | 10/2003 | Guven et al. | |
| 2005/0078923 | A1 | 4/2005 | Dapelo et al. | |
| 2007/0295704 | A1 * | 12/2007 | Sigler | B32B 15/18 219/146.22 |
| 2015/0110451 | A1 | 4/2015 | Blazer et al. | |
| 2017/0131496 | A1 * | 5/2017 | Blazer | B29D 11/00701 |
| 2019/0278042 | A1 * | 9/2019 | Blazer | G02B 6/4432 |
| 2020/0316728 | A1 | 10/2020 | Durand et al. | |
| 2021/0355820 | A1 * | 11/2021 | Duan | G02B 6/4483 |

OTHER PUBLICATIONS

International Search Report and Written Opinion of the International Searching Authority; PCT/US2022/016370; mailed on Jun. 24, 2022, 12 pages; International Searching Authority.

* cited by examiner

*Primary Examiner* — Uyen Chau N Le
*Assistant Examiner* — Hoang Q Tran
(74) *Attorney, Agent, or Firm* — Thomas R. Irwin

(57) ABSTRACT

An optical communication cable and related method is provided. The cable includes a cable body and a plurality of optical transmission elements surrounded by the cable body. The cable includes a reinforcement layer surrounding the plurality of optical transmission elements and located between the cable body and the plurality of optical transmission elements. The reinforcement layer includes a first portion and a second portion coupled together and extending longitudinally away from each other.

20 Claims, 6 Drawing Sheets

OPTICAL FIBER CABLE WITH WELDED ARMOR LAYER

CROSS-REFERENCE TO RELATED APPLICATION

This application is a continuation of International Application No. PCT/US2022/016370 filed Feb. 15, 2022, which claims the benefit of priority under 35 U.S.C. § 119 of U.S. Provisional Application No. 63/151,196, filed on Feb. 19, 2021, the content of which is relied upon and incorporated herein by reference in its entirety.

BACKGROUND

The disclosure relates generally to optical communication cables and more particularly to optical communication cables including a reinforcing layer, such as an armor layer. Optical communication cables have seen increased use in a wide variety of electronics and telecommunications fields. Optical communication cables may contain or surround one or more optical communication fibers. The cable provides structure and protection for the optical fibers within the cable.

SUMMARY

One embodiment of the invention relates to an optical communication cable including a cable jacket formed from a polymer material and defining a longitudinal axis, a plurality of optical fibers surrounded by the cable jacket, and a reinforcement layer. The reinforcement layer surrounds the plurality of optical fibers and is located between the cable jacket and the plurality of optical fibers. The reinforcement layer includes a first portion and a second portion coupled to the first portion via a plurality of distinct welding locations. The first portion extends from the plurality of welding locations along the longitudinal axis in a first direction, and the second portion extends from the plurality of welding locations along the longitudinal axis in a second direction opposite the first direction.

Another embodiment of the invention relates to an optical communication cable including a cable jacket formed from a polymer material and defining a longitudinal axis, a plurality of optical fibers surrounded by the cable jacket, and a reinforcement layer. The reinforcement layer surrounds the plurality of optical fibers and is located between the cable jacket and the plurality of optical fibers. The reinforcement layer includes a first portion, a second portion, and a weld extending circumferentially around the plurality of optical fibers. The weld couples the first portion and the second portion. The first portion extends from the weld along the longitudinal axis in a first direction, and the second portion extends from the weld along the longitudinal axis in a second direction opposite the first direction. The weld includes a plurality of recesses Another embodiment of the invention relates to a method of manufacturing an optical fiber cable. The method includes unspooling an optical fiber, unspooling a first sheet of metal having a minor edge and opposing major edges, and unspooling a second sheet of metal having a minor edge and opposing major edges. The method includes forming a reinforcement layer by welding the first sheet of metal to the second sheet of metal via a periphery of a welding unit along the minor edges of the first and second sheets of metals. The periphery of the welding unit includes a plurality of protrusions and a plurality of recesses between the plurality of protrusions. The method includes forming the reinforcement layer around the optical fiber, and extruding a polymer composition around the reinforcement layer to form a jacket.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Referring generally to the figures, various embodiments of an optical communication cable (e.g., a fiber optic cable, an optical fiber cable, etc.) are shown. In general, the cable embodiments disclosed herein include a plurality of optical transmission elements (e.g., optical fiber ribbons), a reinforcement layer (e.g., a corrugated metal armor layer) surrounding the optical transmission elements and a cable body or jacket surrounding the reinforcement layer. When forming optical communication cables of long length (e.g., longer than 2,200 meters), the reinforcement layer may be resupplied with a second portion of the reinforcement layer that is coupled to the depleted first portion of the reinforcement layer. As described in more detail below, Applicant has discovered an improved method of coupling together the first portion and the second portion of the reinforcement layer that increases the strength and robustness of the coupling as compared to other methods, such as a continuous linear seam weld.

In various embodiments, the strength and resiliency of the coupling are improved by providing an intermittent coupling rather than a continuous seam. The first portion is welded to the second portion at a plurality of welding locations, which are formed as a plurality of recesses within the first portion. The peaks are between the plurality of recesses. The first portion and second portion are less-tightly coupled and/or not coupled at one or more of the peaks. Applicant has observed that by providing alternating sections where first portion and second portion are less tightly coupled, which provides increased flexibility. This increase flexibility provides an improved robustness to the coupling as compared to a continuous solid weld. This new weld pattern has proven superior to alternate welding patterns with a reduction in crack propagation and delamination during manufacturing, such as when the reinforcement layer is being corrugated. This new weld pattern also has a reduced complexity in manufacturing and ease of repeatability not present in alternate welding patterns, such as a continuous solid seam.

Figure 1:
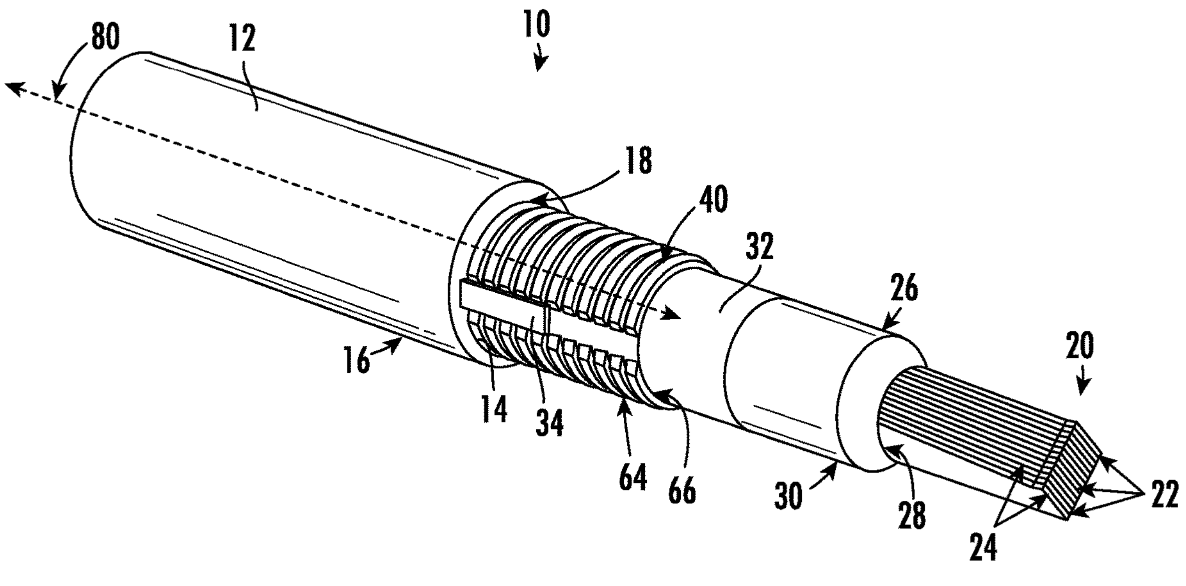
FIG. 1 is a perspective view of an optical communication cable, according to an exemplary embodiment.
Figure 2:
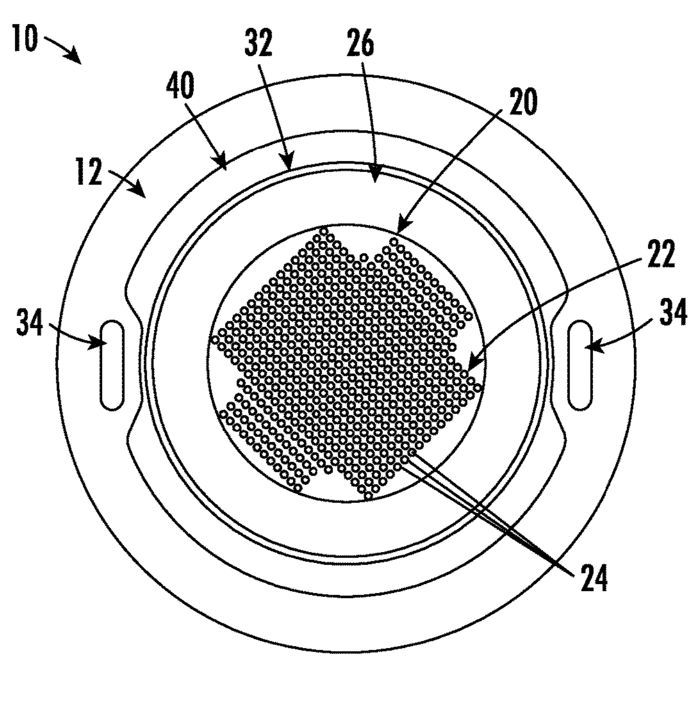
FIG. 2 is a cross-section view of the cable of FIG. 1, according to an exemplary embodiment.

FIG. 1 and FIG. 2 depict an optical fiber cable, shown as ribbon cable 10, according to an exemplary embodiment. The ribbon cable 10 includes a cable jacket 12 having an inner surface 14 and an outer surface 16. The inner surface 14 defines a central bore 18, and the outer surface 16 defines an outermost extent of the ribbon cable 10.

In various embodiments, jacket 12 is formed from a polymer material and in specific embodiments is formed from a polyolefin material. Exemplary polyolefins suitable for use in the jacket 12 include one or more of medium-density polyethylene (MDPE), high-density polyethylene (HDPE), low-density polyethylene (LDPE), linear low-density polyethylene (LLDPE), and/or polypropylene (PP), amongst others. Exemplary thermoplastic elastomers suitable for use in the jacket 12 include one or more of ethylene-propylene rubber (EPR), ethylene-propylene-diene rubber (EPDM), ethylene-octene (EO), ethylene-hexene (EH), ethylene-butene (EB), ethylene-vinyl acetate (EVA), and/or styrene-ethylene-butadiene-styrene (SEBS), amongst others. In various embodiments, jacket 12 includes a polymer composition that is flame resistant (FR), and the polymer composition includes various flame resistant additives and fillers, in addition to PE.

Cable 10 also includes one or more elongate strength element(s), shown as strength rods 34, that extend along longitudinal axis 80 of cable jacket 12, and generally provide increased tensile strength to cable 10. As shown, strength rods 34 are at least partially embedded in cable jacket 12 and are located adjacent to a reinforcement layer, shown as armor layer 40. In the embodiment depicted in FIG. 1, a water barrier layer 32 is located within jacket 12 and surrounds buffer tube 26. Water barrier layer 32 absorbs water which in turn prevents or limits water from traveling along cable 10 and/or from contacting the optical fibers 24. In embodiments, the water barrier layer 32 is a water-blocking tape, e.g., that absorbs water and/or swells when contacted with water. In other embodiments, the water barrier layer 32 is an SAP powder.

The water barrier layer 32 circumferentially surrounds exterior surface 30 of buffer tube 26. The buffer tube 26 has an interior surface 28 and an exterior surface 30. Disposed within interior surface 28 of the buffer tube 26 are optical communication elements.

In the embodiment depicted, the optical communication elements include a stack 20 of optical fiber ribbons 22 surrounded by jacket 12. Each optical fiber ribbon 22 includes a plurality of optical fibers 24 arranged in a planar configuration and bound together, e.g., with a matrix material. In embodiments, the stack 20 includes various numbers of ribbons 22, e.g., from one to thirty-two optical fiber ribbons 22. In embodiments, each optical fiber ribbon 22 includes from four to thirty-six optical fibers 24. Thus, in embodiments, the optical fiber cable may include varying numbers of optical fibers 24 in bore 18, e.g., anywhere from four to 3,456 optical fibers 24.

A reinforcement layer, shown as armor layer 40, is wrapped around the interior elements (including optical fiber ribbons 22) of cable 10 such that armor layer 40 surrounds optical fibers 24 within bore 18. Armor layer 40 is between jacket 12 and the one or more optical fibers 24. Armor layer 40 includes exterior surface 64 facing outwards towards jacket 12, and an opposing interior surface 66 that surrounds one or more optical fibers 24. Armor layer 40 generally extends all or substantially all of the axial length of cable 10. Armor layer 40 generally provides an additional layer of protection to optical fibers 24 within cable 10, and may provide resistance against damage (e.g., damage caused by contact or compression during installation, damage from the elements, damage from rodents, etc.). In specific embodiments, armor layer 40 is formed from a sheet of material having a width sufficient so that armor layer 40 completely surrounds the cable components within the armor layer. In a specific embodiment, armor layer 40 is formed from a metal, such as steel.

Figure 3:
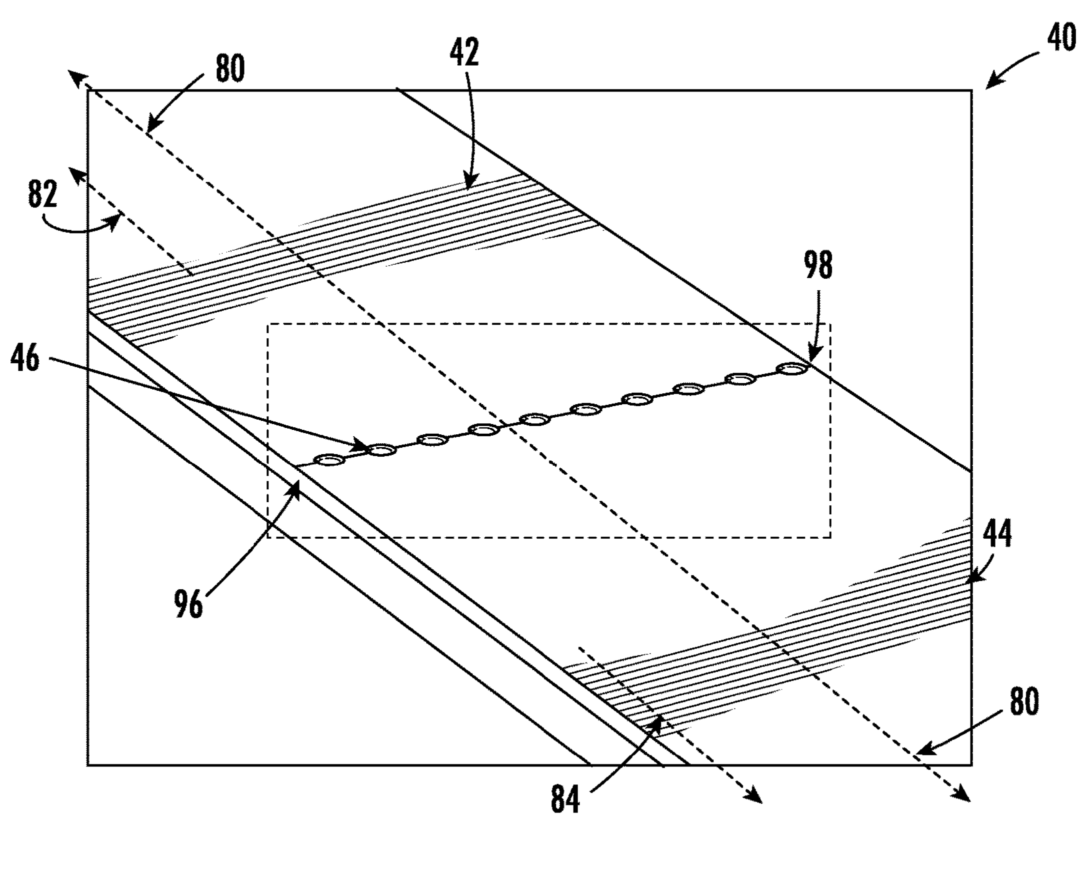
FIG. 3 is a perspective view of the armor layer of the cable of FIG. 1 before the armor layer has been formed, according to an exemplary embodiment.
Figure 4:
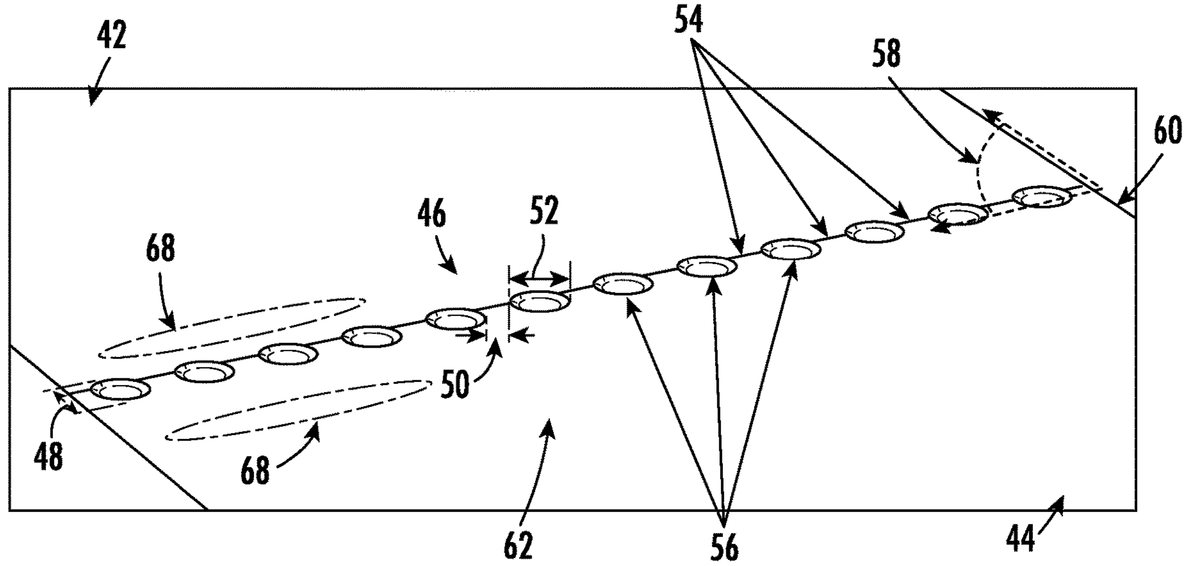
FIG. 4 is a detailed perspective view of the armor layer of the cable of FIG. 1 before the armor layer has been formed, according to an exemplary embodiment.

Referring to FIG. 3 and FIG. 4, various aspects of armor layer 40 are shown. When cable is formed in longer lengths, such as more than 2,200 meters, the material forming the armor layer 40, e.g., steel tape, may need to be resupplied. For example, first portion 42 is initially used to form armor layer 40. When the material forming first portion 42 is exhausted, second portion 44 of armor layer 40 is coupled to first portion, such as via weld 46. Thus, armor layer includes first portion 42, second portion 44, and weld 46. First portion 42 extends from weld 46 along longitudinal axis 80 in first direction 82 and second portion 44 extends along longitudinal axis 80 from weld 46 in second direction 84 opposite first direction 82.

In a specific embodiment, first portion 42 and second portion 44 of armor layer 40 are coupled together at a coupling location, shown as weld 46. Weld 46 includes one or more coupling locations (e.g., welding locations), shown as a plurality of recesses 56 that are separated by a plurality of peaks 54. Peaks 54 extend past (e.g., higher than) one or more of the neighboring plurality of recesses 56. In a specific embodiment, the weld 46 extends circumferentially around the plurality of optical fibers 24.

In a specific embodiment and as will be explained in more detail below, the plurality of recesses 56 correspond to where first portion 42 has been coupled to second portion 44, such as via welding. In various embodiments, first portion 42 includes a plurality of recesses 56 where first portion 42 is deformed and/or welded into second portion 44.

In a specific embodiment, the plurality of recesses 56 are distinct from each other (FIG. 4). In a specific embodiment, weld 46 includes between four recesses 56 and sixteen recesses 56 per inch of weld 46 (e.g., as transiting along upper surface 62 of weld 46), and more specifically between six recesses 56 and ten recesses 56, and even more specifically seven recesses 56. In a specific embodiment, between six and ten welding locations per inch are disposed along an upper surface 62 of the first portion 42.

Applicant has observed that forming weld 46 via one or more coupling locations (e.g., recesses 56) provides a stronger coupling of first portion 42 and second portion 44 compared to a continuous linear seam. In various embodiments, the intermittent coupling of first portion 42 and second portion 44 improves flexibility to the weld 46, thereby reducing stress-induced cracking and breaking.

Armor layer 40 includes a width 48 that varies between first end 96 and second end 98 of weld 46. In a specific embodiment, the plurality of recesses 56 have a smaller width 52 compared to the plurality of peaks 54, which have a relatively larger width 50. In a specific embodiment, upper surface 62 of neighboring portions 68 of armor layer 40, which are adjacent to weld 46, are coplanar and/or nearly coplanar to one or more of the peaks 54. In a specific embodiment, each of peaks 54 extends past each of recesses 56.

Weld 46 extends from sidewall 60 of unformed armor layer 40 at angle 58. In a specific embodiment angle 58 is between 30 degrees and 60 degrees, and more specifically between 40 degrees and 50 degrees, and even more specifically 45 degrees. In a specific embodiment, weld 46 extends helically through armor layer 40 around optical fibers 24 when armor layer 40 is formed within cable 10. In various embodiments, the orientation (e.g., the angles) of angle 58 described herein are also between weld 46 and longitudinal axis 80 (e.g., because sidewall 60 extends parallel to longitudinal axis 80).

In a specific embodiment, one or more of the plurality of recesses 56 are disposed on an interior surface 66 of armor layer 40. In a specific embodiment, one or more of the plurality of recesses 56 are disposed on an exterior surface 64 of armor layer 40. In a specific embodiment, one or more of the plurality of recesses 56 are disposed on an interior surface 66 of armor layer 40 and one or more of the plurality of recesses 56 are disposed on an exterior surface 64 of armor layer 40 (e.g., via armor layer 40 being separated and recombined during formation of cable 10, which is explained in more detail below).

Referring to FIG. 5-9, various aspects of an exemplary method of producing cable 10 are shown. In a specific embodiment, a coupling device, shown as welding unit 70, couples first portion 42 and second portion 44. Welding unit 70 includes a periphery 72 that includes a plurality of protrusions 74 separated by a plurality of recesses 76. In a specific embodiment, periphery 72 of welding unit 70 is arcuate-shaped, and even more specifically periphery 72 of welding unit 70 is circular.

Figure 6:
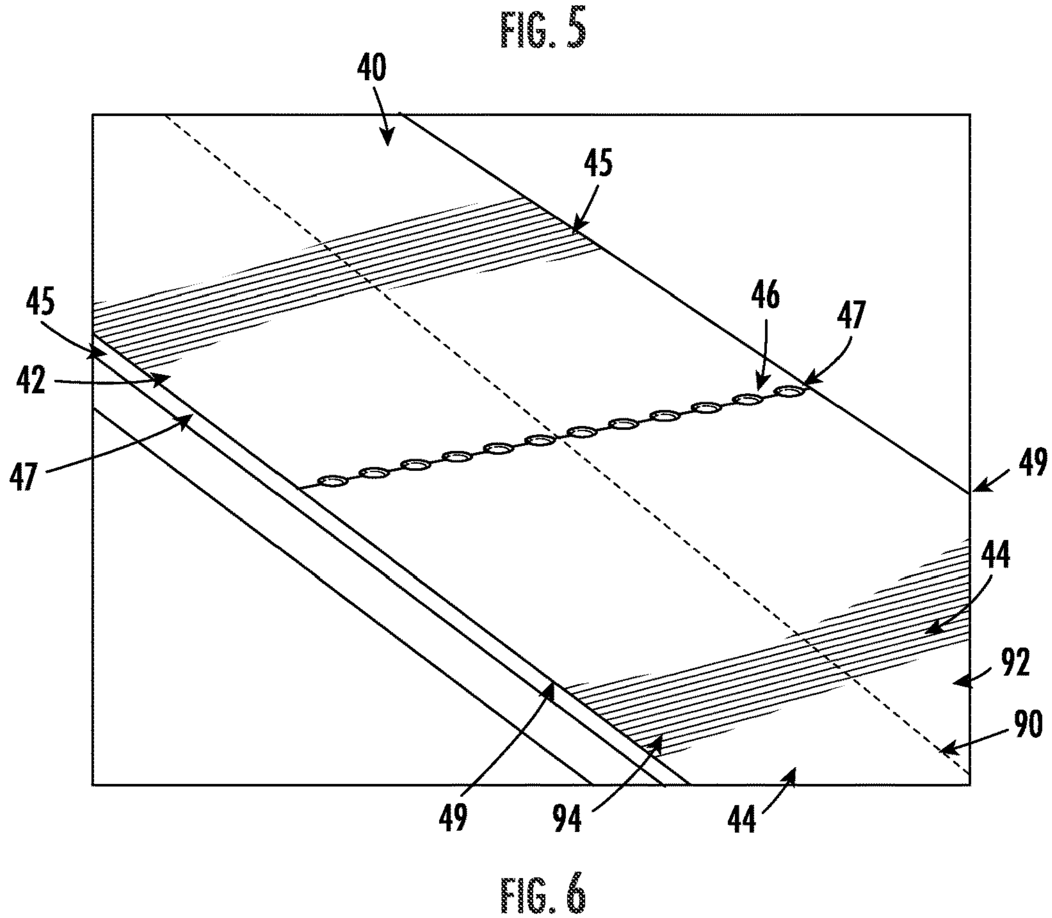
FIG. 6 is a perspective view of the armor layer of the cable of FIG. 1 before the armor layer has been formed, according to an exemplary embodiment.

Referring to FIG. 6, periphery 72 is brought into contact with, e.g., interfaces with, first portion 42 that is located next to (e.g., above) second portion 44. First portion 42 includes a minor edge 43 (e.g., at a longitudinal end) and opposing major edges 45 (e.g., either edge that extends longitudinally along either side of first portion 42. Second portion 44 includes a minor edge 47 (e.g., at a longitudinal end) and opposing major edges 49 (e.g., either edge that extends longitudinally along either side of second portion 44). When being coupled together, minor edge 43 of first portion 42 is placed at or near (e.g., extending slightly past) minor edge 47 of second portion 44.

In a specific embodiment, protrusions 74 of welding unit 70 interface with first portion 42 to form recesses 56 via welding first portion 42 to second portion 44. In a specific embodiment, periphery 72 of welding unit 70 welds first portion 42 to second portion 44 along the minor edges 43, 47 of the first and second portions 42, 44. In a specific embodiment, an electrical current, such as electricity, is emitted into first portion 42 and second portion 44 via welding unit 70. An electrical-receiving element (e.g., a copper plate) is placed beneath second portion 44 to complete the electrical circuit. Resistance to the electrical current within first portion 42 and/or second portion 44 translates the electrical current into heat, and as a result first portion 42 and second portion 44 are coupled (e.g., via welding and/or melting and bonding). In a specific embodiment, welding unit 70 is formed from an electrically-conductive metal, such as a copper alloy.

After first portion 42 is coupled to second portion 44, armor layer 40 is longitudinally separated (e.g., cut) along cut line 90. As a result, armor layer 40 is separated into upper portion 92 and lower portion 94. Upper portion 92 and lower portion 94 are formed into opposing concave portions that each form a portion (e.g., an upper half and a lower half) of armor layer 40. Upper portion 92 and lower portion 94 may be coupled together, e.g., via welding, adhesives, crimp fit, or just placed with overlapping longitudinal portions, to form armor layer 40. Armor layer 40 is formed around the optical fiber(s) 24 via forming the upper portion 92 and the lower portion 94 together around the optical fiber(s) 24.

Figure 5:
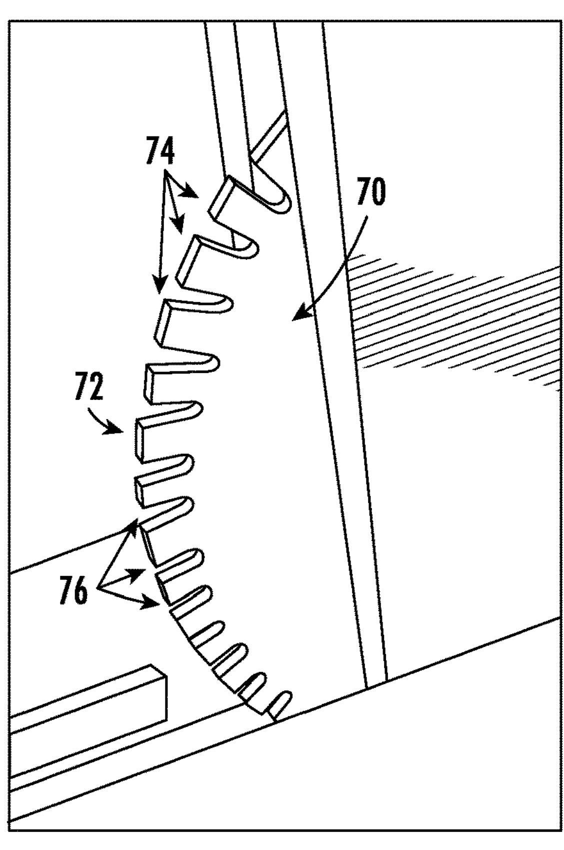
FIG. 5 is a perspective view of a device for forming a weld in the armor layer of FIG. 3, according to an exemplary embodiment.
Figure 7:
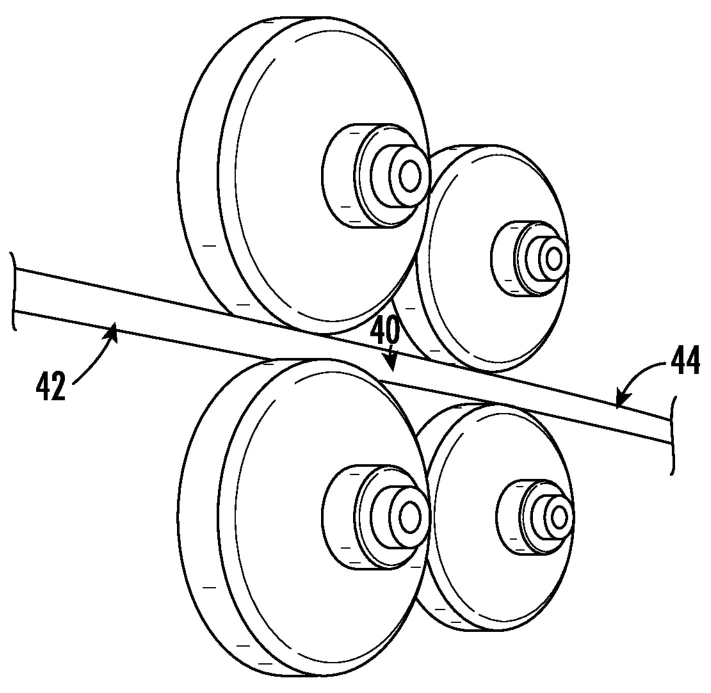
FIG. 7 depict one or more stages of the process of forming the armor layer of FIG. 4, according to an exemplary embodiment.
Figure 8:
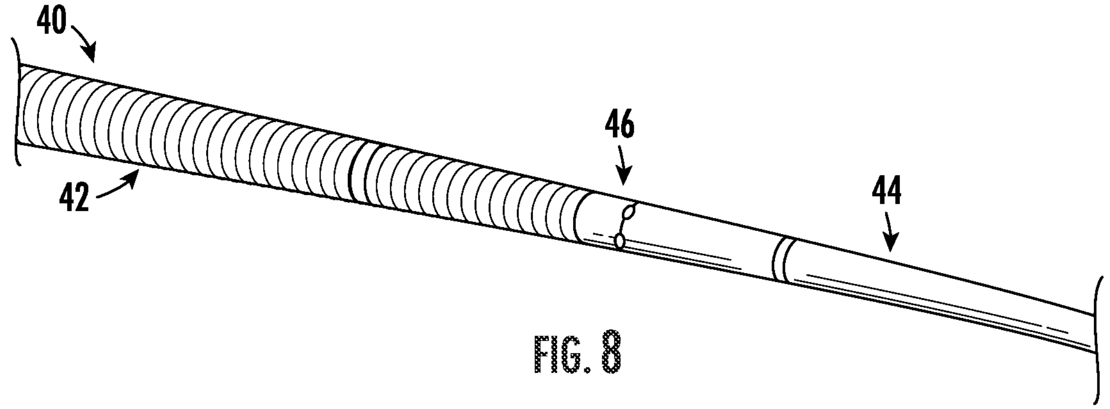
FIG. 8 depict one or more stages of the process of forming the armor layer of FIG. 4, according to an exemplary embodiment.
Figure 9:
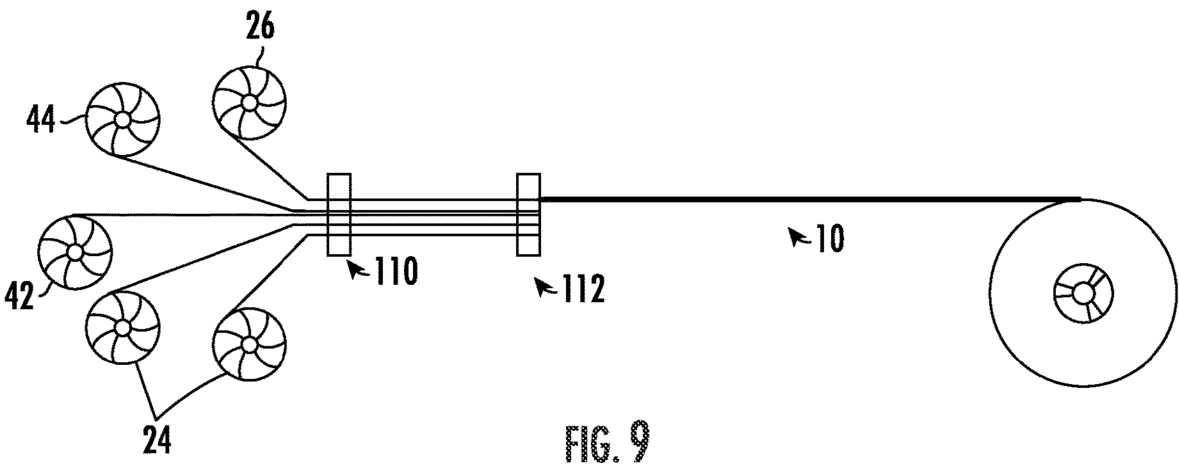
FIG. 9 is a method of manufacturing the optical fiber ribbon cable of FIG. 1, according to an exemplary embodiment.

Referring to FIG. 7-9, depicted therein are various examples of weld 46 being formed between first portion 42 and second portion 44 in armor layer 40. Referring to FIG. 9, first portion 42, such as a first sheet of metal, and second portion 44, such as a second sheet of metal, are dispensed into first assembly-line machine 110. First assembly-line machine 110 includes welding unit 70 (FIG. 5). First assembly-line machine 110 couples first portion 42 and second portion 44 together, such as via weld 46. At second assembly-line machine 112, buffer tube 26 is formed around one or more optical fibers 24, armor layer 40 is formed around buffer tube 26, and jacket 12 is formed around armor layer 40, thereby producing cable 10.

Figure 10:
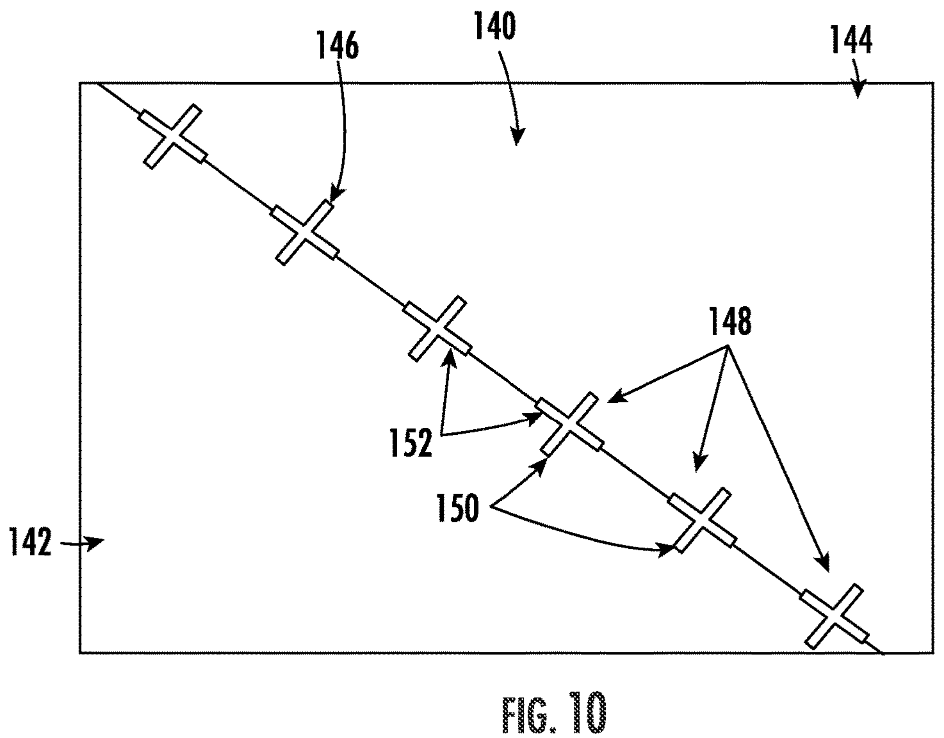
FIG. 10 is a top view of an armor layer in an optical fiber ribbon cable before the armor layer has been formed, according to an exemplary embodiment.

Referring to FIG. 10, armor layer 140 is shown according to an exemplary embodiment. Armor layer 140 is similar to armor layer 40 with the exception of the differences described. Armor layer 140 includes first portion 142 and second portion 144 coupled together, such as via weld 146. First portion 142 and second portion 144 are coupled together via one or more coupling locations, shown as welding locations 148. One or more of welding locations 148 include a longitudinal portion 150, which extends longitudinally along armor layer 140, and a cross-portion, shown as perpendicular portion 152, which extends at an angle relative to longitudinal portion 150 (e.g., perpendicular to longitudinal portion 150).

Figures 11, 12:
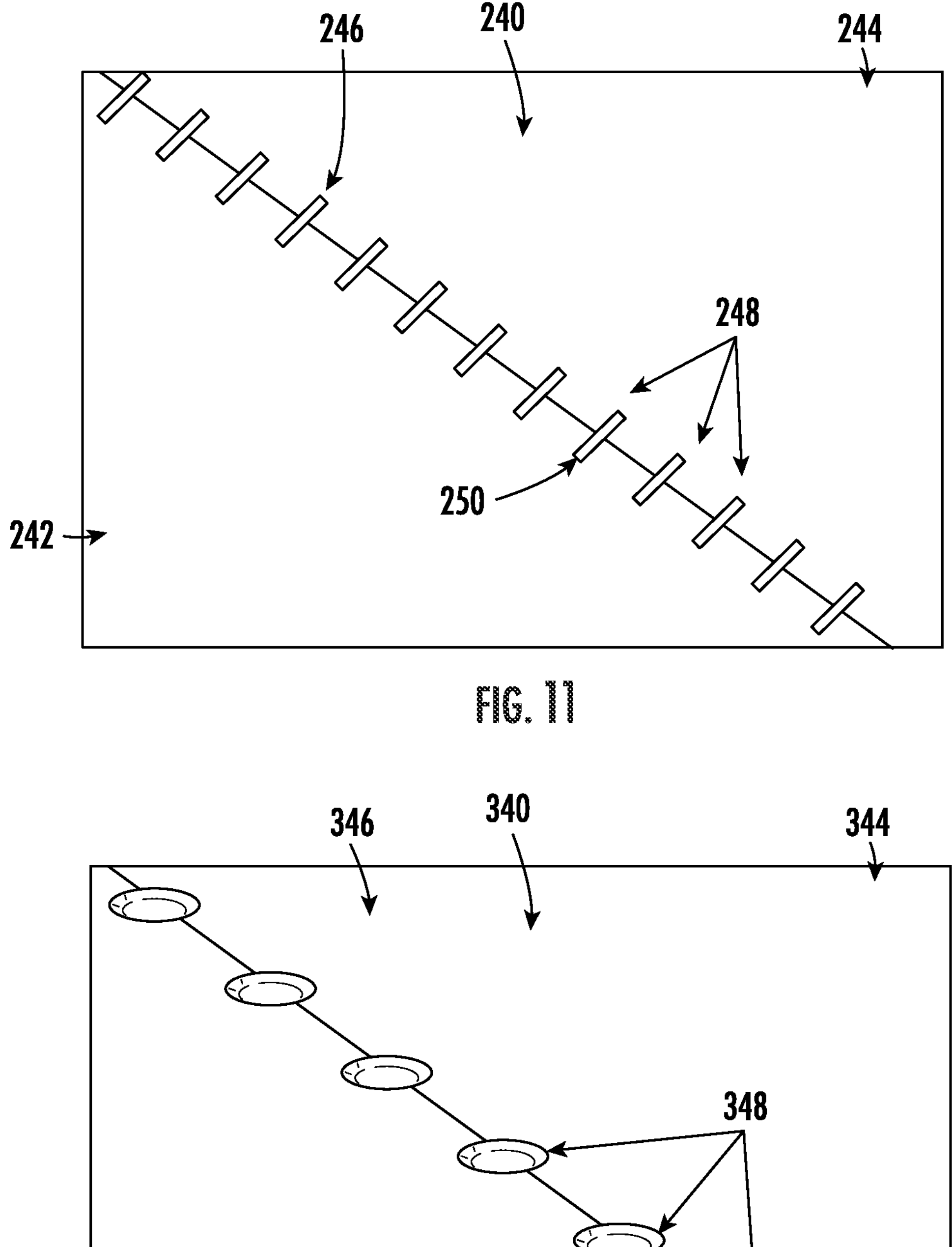
FIG. 11 is a top view of an armor layer in an optical fiber ribbon cable before the armor layer has been formed, according to an exemplary embodiment.
FIG. 12 is a top view of an armor layer in an optical fiber ribbon cable before the armor layer has been formed, according to an exemplary embodiment.

Referring to FIG. 11, armor layer 240 is shown according to an exemplary embodiment. Armor layer 240 is similar to armor layer 40 and armor layer 140 with the exception of the differences described. Armor layer 240 includes first portion 242 and second portion 244 coupled together, such as via weld 246. First portion 242 and second portion 244 are coupled together via one or more coupling locations, shown as welding locations 248. One or more of welding locations 248 include a longitudinal portion 250, which extends longitudinally along armor layer 140.

Referring to FIG. 12, armor layer 340 is shown according to an exemplary embodiment. Armor layer 340 is similar to armor layer 40, armor layer 140, and armor layer 240 with the exception of the differences described. Armor layer 340 includes first portion 342 and second portion 344 coupled together, such as via weld 346. First portion 342 and second portion 344 are coupled together via one or more coupling locations, shown as welding locations 348. One or more of welding locations 348 are shaped in a rounded form, such as an oval and/or a circle.

In various embodiments, weld 46 includes one or more of welding locations 48, welding locations 148, welding locations 248 and/or welding locations 348.

While the specific cable embodiments discussed herein and shown in the figures relate primarily to cables and core elements that have a substantially circular cross-sectional shape defining substantially cylindrical internal bores, in other embodiments, the cables and core elements discussed herein may have any number of cross-section shapes. For example, in various embodiments, cable jacket 12, may have an oval, elliptical, square, rectangular, triangular, hexagonal or other cross-sectional shape.

Although first portion 42 has been described above as being "above" second portion 44 when being coupled together, it is contemplated herein that first portion 42 may be placed in any orientation relative to second portion as they are being coupled together. Further, it is contemplated herein that second portion 44 may be welded to first portion 42 rather than first portion 42 being welded to second portion 44.

The optical transmission elements discussed herein include optical fibers that may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate and chalcogenide glasses, as well as crystalline materials such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical communication cable comprising:

a cable jacket formed from a polymer material, the cable jacket defining a longitudinal axis;

a plurality of optical fibers surrounded by the cable jacket; and a reinforcement layer surrounding the plurality of optical fibers and located between the cable jacket and the plurality of optical fibers, the reinforcement layer comprising a first portion and a second portion, the first portion comprising a first minor edge at a first longitudinal end and the second portion comprising a second minor edge at a second longitudinal end, the second portion being coupled to the first portion at a single interface between the first portion and the second portion via a plurality of distinct welding locations joining the first minor edge to the second minor edge, the first portion extends from the plurality of welding locations along the longitudinal axis in a first direction, the second portion extends from the plurality of welding locations along the longitudinal axis in a second direction opposite the first direction.

2. The optical communication cable of claim 1, wherein the plurality of welding locations comprises a plurality of recesses, and the first portion comprises a plurality of peaks between the plurality of recesses.

3. The optical communication cable of claim 2, wherein each of the plurality of peaks defines a width of the reinforcement layer that is larger than a width of each of the plurality of recesses.

4. The optical communication cable of claim 2, wherein one or more of the plurality of peaks are coplanar with a neighboring portion of the reinforcement layer.

5. The optical communication cable of claim 2, wherein one or more of the plurality of recesses are disposed on an interior surface of the reinforcement layer.

6. The optical communication cable of claim 2, wherein one or more of the plurality of recesses are disposed on an exterior surface of the reinforcement layer.

7. The optical communication cable of claim 1, wherein between 6 and 10 welding locations per inch are disposed along an upper surface of the first portion.

8. The optical communication cable of claim 1, wherein the reinforcement layer is formed from a metal.

9. An optical communication cable comprising:

a cable jacket formed from a polymer material, the cable jacket defining a longitudinal axis;

a plurality of optical fibers surrounded by the cable jacket; and a reinforcement layer surrounding the plurality of optical fibers and located between the cable jacket and the plurality of optical fibers, the reinforcement layer including a first portion having a first upstream end spatially disposed from a first downstream end along the longitudinal axis, a second portion having a second upstream end spatially disposed from a second downstream end along the longitudinal axis, and a weld extending circumferentially around the plurality of optical fibers and coupling the downstream end of the first portion and the upstream end of the second portion at a single interface between the first portion and the second portion along a length of the reinforcement layer, the first portion extends from the weld along the longitudinal axis in a first direction towards the first upstream end and the second portion extends from the weld along the longitudinal axis in a second direction towards the second downstream end, the second direction being opposite the first direction, the weld comprising a plurality of recesses.

10. The optical communication cable of claim 9, wherein the weld comprises between 4 and 16 recesses per inch.

11. The optical communication cable of claim 9, wherein the weld extends helically around the reinforcement layer.

12. The optical communication cable of claim 9, wherein the weld extends around the reinforcement layer at an angle between 30 degrees and 60 degrees relative to the longitudinal axis.

13. The optical communication cable of claim 9, wherein one or more of the plurality of recesses are disposed on an interior surface of the reinforcement layer.

14. The optical communication cable of claim 9, wherein one or more of the plurality of recesses are disposed on an exterior surface of the reinforcement layer.

15. A method of manufacturing an optical fiber cable, the method comprising:

unspooling an optical fiber;

unspooling a first sheet of metal having a first upstream minor edge, a first downstream minor edge, and first opposing major edges, the first opposing major edges extending longitudinally along a length of the first sheet of metal between the first upstream minor edge and the first downstream minor edge, and the first upstream and first downstream minor edges extending laterally across a width of the first sheet of metal;

unspooling a second sheet of metal having a second upstream minor edge, a second downstream minor edge, and second opposing major edges, the second opposing major edges extending longitudinally along a length of the second sheet of metal between the second upstream minor edge and the second downstream minor edge, and the second upstream and second downstream minor edges extending laterally across a width of the second sheet of metal;

forming a reinforcement layer by welding the first sheet of metal to the second sheet of metal via a periphery of a welding unit along the first upstream minor edge of the first sheet of metal and the second downstream minor edge of the second sheet of metal at a single interface between the first sheet of metal and the second sheet of metal along a length of the reinforcement layer, wherein the periphery of the welding unit comprises a plurality of protrusions and a plurality of recesses between the plurality of protrusions;

forming the reinforcement layer around the optical fiber; and extruding a polymer composition around the reinforcement layer to form a jacket.

16. The method of claim 15, further comprising:

separating the reinforcement layer longitudinally into an upper portion and a lower portion, wherein the forming the reinforcement layer around the optical fiber comprises coupling the upper portion and the lower portion together around the optical fiber.

17. The method of claim 16, wherein the welding comprising forming a plurality of recesses in the first sheet, wherein one or more of the plurality of recesses in the first sheet are disposed on an interior surface of the reinforcement layer.

18. The method of claim 16, wherein the welding comprising forming a plurality of recesses in the first sheet, wherein one or more of the plurality of recesses in the first sheet are disposed on an exterior surface of the reinforcement layer.

19. The method of claim 15, wherein welding the first sheet of metal to the second sheet of metal comprises emitting electricity through the first sheet of metal and the second sheet of metal via the welding unit.

20. The method of claim 15, wherein the periphery of the welding unit comprises an arcuate shape.

* * * * *